United States Patent
Panico et al.

(10) Patent No.: US 11,790,014 B2
(45) Date of Patent: Oct. 17, 2023

(54) SYSTEM AND METHOD OF DETERMINING CONTENT SIMILARITY BY COMPARING SEMANTIC ENTITY ATTRIBUTES

(71) Applicant: Microsoft Technology Licensing, LLC

(72) Inventors: Matthew Vincent Panico, Redmond, WA (US); Ashwini Lakshmi Narasimhan, Bothell, WA (US); Frederick David Jones, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 17/567,019

(22) Filed: Dec. 31, 2021

(65) Prior Publication Data

US 2023/0214429 A1    Jul. 6, 2023

(51) Int. Cl.
*G06F 7/02* (2006.01)
*G06F 16/00* (2019.01)
(Continued)

(52) U.S. Cl.
CPC ............ *G06F 16/93* (2019.01); *G06F 40/10* (2020.01); *G06F 40/30* (2020.01); *G06N 20/00* (2019.01)

(58) Field of Classification Search
CPC .......... G06F 16/93; G06F 40/10; G06N 20/00
See application file for complete search history.

(56) References Cited

U.S. PATENT DOCUMENTS 6,041,323 A * 3/2000 Kubota ............... G06F 16/3341
707/999.005
8,495,061 B1   7/2013 Lifantsev
(Continued)

FOREIGN PATENT DOCUMENTS

KR    102158352 B1    9/2020
WO    2016172288 A1   10/2016

OTHER PUBLICATIONS

"AutoClassifier Integrated AI and Rules-Based Tagging and Text Analytics", Retrieved From : https://www.bainsight.com/classification/, Mar. 7, 2021, 7 Pages.
(Continued)

*Primary Examiner* — Bruce M Moser
(74) *Attorney, Agent, or Firm* — NovoTechIP International PLLC

(57) ABSTRACT

A method for identifying documents that are similar in content to an input document includes receiving a request for identifying similar documents from among a plurality of candidate documents, retrieving document classification attributes for the input document and the candidate documents, where the document classification attributes are document level attributes. The method also includes comparing the document classification attributes of the input document with classification attributes of the candidate documents to identify a subset of the candidate documents having matching document classification attributes, retrieving semantic entities from the input document and from candidate documents in the subset, pairwise comparing the semantic entity attribute of the input document with the semantic entity attribute of the candidate documents in the subset to identify semantic entities having matching semantic attributes, calculating a content similarity score between the semantic entity of the input document and the semantic entity of the candidate document in the subset, calculating a total similarity score for the candidate documents in the subset based on the content similarity score, a number of matching document classification attributes, and weight factors, and selecting similar documents from the subset based on the total similarity score.

20 Claims, 10 Drawing Sheets

(51) Int. Cl.
  *G06F 16/93* (2019.01)
  *G06F 40/30* (2020.01)
  *G06N 20/00* (2019.01)
  *G06F 40/10* (2020.01)

(56) References Cited

U.S. PATENT DOCUMENTS

| | | | |
|---|---|---|---|
| 8,577,865 | B2 | 11/2013 | Elsaesser et al. |
| 9,031,886 | B2 | 5/2015 | Heidasch et al. |
| 9,646,082 | B2 | 5/2017 | Al-Kofahi et al. |
| 9,792,355 | B2 | 10/2017 | Heidasch et al. |
| 11,157,553 | B2 | 10/2021 | Sawruk |
| 2008/0270462 | A1 | 10/2008 | Thomsen |
| 2009/0125381 | A1 | 5/2009 | Delepet |
| 2012/0265767 | A1 | 10/2012 | Brdiczka et al. |
| 2019/0138615 | A1 | 5/2019 | Huh et al. |
| 2023/0134218 | A1* | 5/2023 | Semenov .......... G06V 30/1448 382/159 |

OTHER PUBLICATIONS

"IHE IT Infrastructure (ITI) Handbook", Retrieved From : https://www.ihe.net/uploadedFiles/Documents/ITI/IHE_ITI_Handbook_Metadata_Rev1-1_Pub_2018-08-20.pdf, Aug. 20, 2018, 30 Pages.

Govindaraju, et al., "Similar Document Search and Recommendation", Retrieved From : https://citeseerx.ist.psu.edu/viewdoc/download?doi=10.1.1.640.4599&rep=rep1&type=pdf, Sep. 21, 2011, 11 Pages.

"Third party classification", Retrieved From : https://web.archive.org/web/20210304032413/https:/support.safetica.com/en/knowledge-base/third-party-classification, Mar. 4, 2021, 4 Pages.

Francesco, Elia, "How to Compute the Similarity Between Two Text Documents?", Retrieved From : https://www.baeldung.com/cs/ml-similarities-in-text, Sep. 9, 2020, 6 Pages.

Jenks, Alma, "Extract information in Excel using Named Entity Recognition(NER) and Power Automate", Retrieved From: https://docs.microsoft.com/en-us/azure/cognitive-services/language-service/named-entity-recognition/tutorials/extract-excel-information, Nov. 2, 2021, 21 Pages.

Sharaki, Omar, "Detecting Document Similarity With Doc2vec", Retrieved From : https://towardsdatascience.com/detecting-document-similarity-with-doc2vec-f8289a9a7db7, Jul. 10, 2020, 19 Pages.

Speier, et al., "Using phrases and document metadata to improve topic modeling of clinical reports", In Journal of Biomedical Informatics, Jun. 1, 2016, 20 Pages.

Tkaczyk, et al., "CERMINE: Automatic Extraction of Structured Metadata from Scientific Literature", In Journal of International Journal on Document Analysis and Recognition (IJDAR), vol. 18, Issue 4, Jul. 3, 2015, pp. 317-335.

"International Search Report and Written Opinion Issued in PCT Application No. PCT/US22/047341", dated Jan. 18, 2023, 12 Pages.

\* cited by examiner

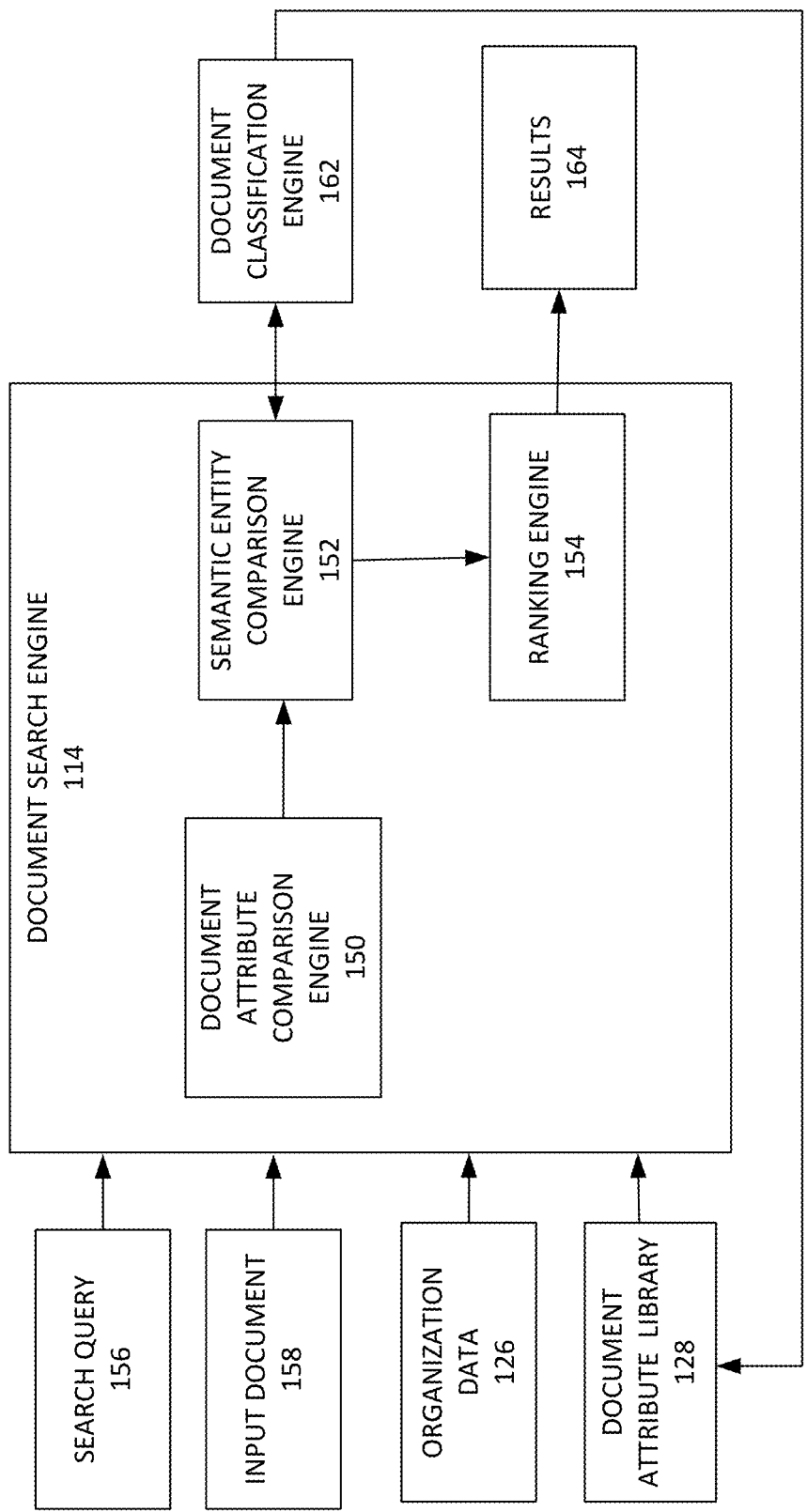

FIG. 5

SYSTEM AND METHOD OF DETERMINING CONTENT SIMILARITY BY COMPARING SEMANTIC ENTITY ATTRIBUTES

BACKGROUND

When creating or reviewing a document or conducting research on a subject, it is often useful to review documents that are similar to a given document. To achieve this, a user may conduct a search for similar documents. Searching is often done by submitting a search query that includes one or more search keywords. The user often selects the keywords based on the subject matter of the given document. The keywords are then used as search terms to identify documents that contain the keywords. Keyword searching, however, may result in incorrect search results, as search terms may be used in different contexts in various documents. Furthermore, when documents relate to the same subject matter, certain keywords may be repeated in many of those documents. As a result, searching for keywords may result in a large number of false positives.

To identify documents that are similar to a given input document, some current searching mechanisms compare the entire or majority of content of the input document, with the entire or majority of content of many documents in a document library. This process requires extensive use of computing and bandwidth resources. Furthermore, in environments where many documents share the same formatting and/or standard language, the shared portions may be falsely flagged as similar content. As a result, many documents that share the same formatting and/or standard content but do not have similarities in substantive content may be falsely identified in search results as being similar documents.

Hence, there is a need for improved systems and methods of identifying documents that are similar in content to a given input document.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a request for identifying one or more documents from among a plurality of candidate documents, the identified one or more documents being similar in content to an input document, retrieving one or more document classification attributes for the input document and one or more of the plurality of candidate documents, the one or more document classification attributes being document level attributes, comparing the one or more document classification attributes of the input document with the one or more document classification attributes of each of the one or more candidate documents to identify a subset of the candidate documents having one or more matching document classification attributes with at least one of the one or more documents classification attributes of the input document, retrieving one or more semantic entities from the input document and from one or more candidate documents in the subset, at least some of the one or more semantic entities having a semantic entity attribute, pairwise comparing the semantic entity attribute of the one or more semantic entities of the input document with the semantic entity attribute of the one or more semantic entities of the candidate documents in the subset to identify one or more semantic entities having matching semantic attributes with the one or more semantic entities of the input document, for semantic entities having matching semantic attributes, calculating a content similarity score between the semantic entity of the input document and the semantic entity of the candidate document in the subset, calculating a total similarity score for one or more of the candidate documents in the subset based on at least one of the content similarity score, a number of matching document classification attributes, and one or more weight factors, selecting one or more similar documents from among the one or more candidate documents in the subset based on the total similarity score, and providing information about the one or more identified similar documents for display on a user interface element.

In yet another general aspect, the instant disclosure presents a method for identifying one or more documents that are similar in content to an input document. In some implementations, the method includes receiving a request for identifying the one or more documents from among a plurality of candidate documents, retrieving one or more document classification attributes for the input document and one or more of the plurality of candidate documents, the one or more document classification attributes being document level attributes, comparing the one or more document classification attributes of the input document with the one or more document classification attributes of each of the one or more candidate documents to identify a subset of the candidate documents having one or more matching document classification attributes with at least one of the one or more documents classification attributes of the input document, retrieving one or more semantic entities from the input document and from one or more candidate documents in the subset, at least some of the one or more semantic entities having a semantic entity attribute, pairwise comparing the semantic entity attribute of the one or more semantic entities of the input document with the semantic entity attribute of the one or more semantic entities of the candidate documents in the subset to identify one or more semantic entities having matching semantic attributes with the one or more semantic entities of the input document, for semantic entities having matching semantic attributes, calculating a content similarity score between the semantic entity of the input document and the semantic entity of the candidate document in the subset, calculating a total similarity score for one or more of the candidate documents in the subset based on at least one of the content similarity score, a number of matching document classification attributes, and one or more weight factors, selecting one or more similar documents from among the one or more candidate documents in the subset based on the total similarity score, and providing information about the one or more identified similar documents for display on a user interface element.

In a further general aspect, the instant application describes a non-transitory computer readable medium on which are stored instructions that when executed cause a programmable device to perform function of receiving a request for identifying one or more documents from among a plurality of candidate documents, the identified one or more documents being similar in content to an input document, retrieving one or more document classification attributes for the input document and one or more of the plurality of candidate documents, the one or more document classification attributes being document level attributes, comparing the one or more document classification attributes of the input document with the one or more document classification attributes of each of the one or more candidate documents to identify a subset of the candidate documents having one or more matching document classification attributes with at least one of the one or more documents classification attributes of the input document, retrieving one or more semantic entities from the input document and from one or more candidate documents in the subset, at least some of the one or more semantic entities having a semantic entity attribute, pairwise comparing the semantic entity attribute of the one or more semantic entities of the input document with the semantic entity attribute of the one or more semantic entities of the candidate documents in the subset to identify one or more semantic entities having matching semantic attributes with the one or more semantic entities of the input document, for semantic entities having matching semantic attributes, calculating a content similarity score between the semantic entity of the input document and the semantic entity of the candidate document in the subset, calculating a total similarity score for one or more of the candidate documents in the subset based on at least one of the content similarity score, a number of matching document classification attributes, and one or more weight factors, selecting one or more similar documents from among the one or more candidate documents in the subset based on the total similarity score, and providing information about the one or more identified similar documents for display on a user interface element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1B depicts an example data flow between some elements of an example system upon which aspects of this disclosure may be implemented.

FIG. 5 is an example graphical user interface (GUI) screen of an application or service that provides similar document identification services.

DETAILED DESCRIPTION

Figure 1A:
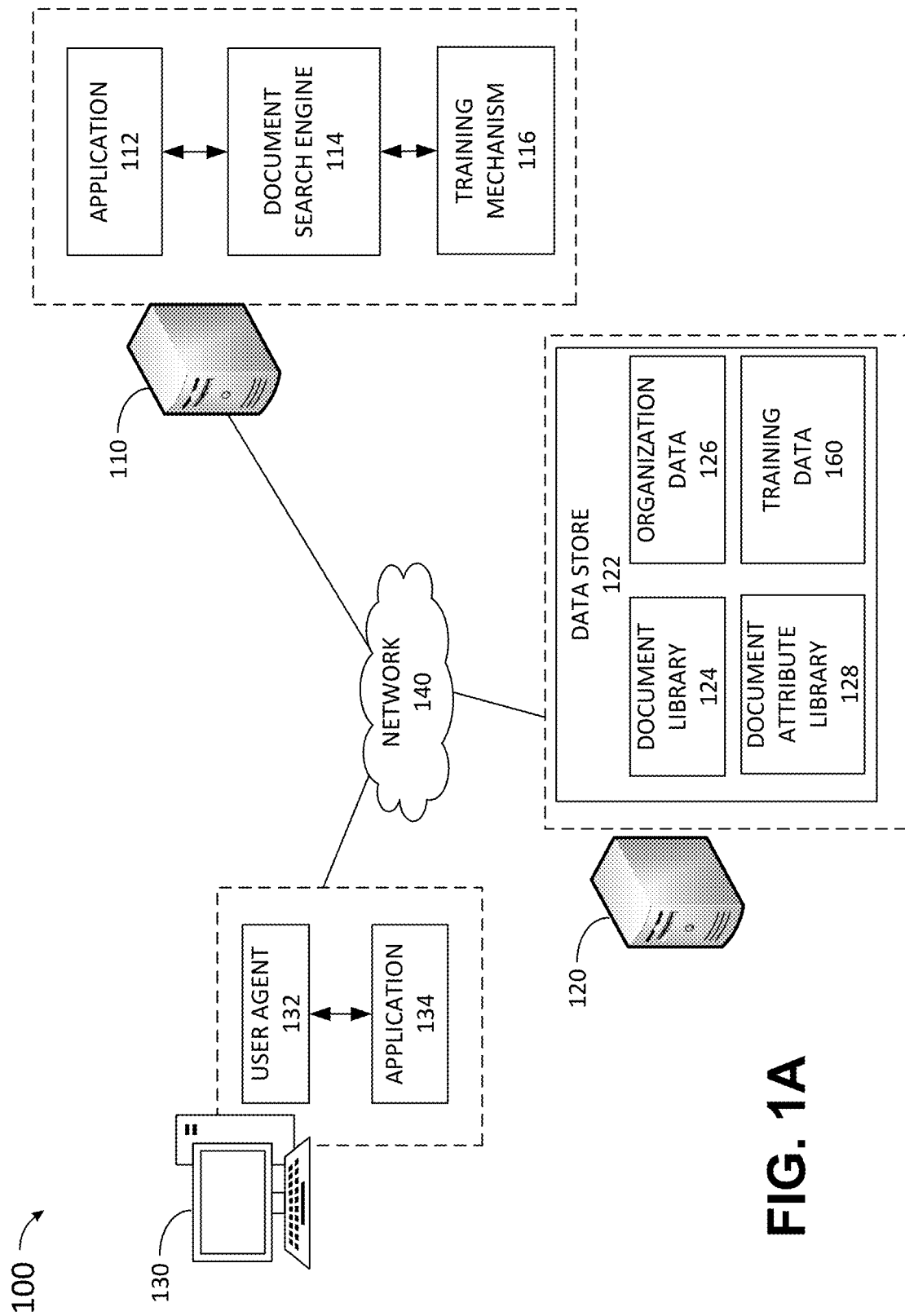
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many currently used software applications enable users to search for documents in order to assist the users create a document and/or improve the quality of a document they are working on. However, most current searching mechanisms search for content by looking for one or more keywords. While keyword searching is useful when looking for documents containing specific subject matter, it sometimes generates incorrect search results when the keywords are used in different contexts in various documents. Furthermore, users may not interested in documents containing specific keywords. Instead, users may be interested in documents that have similar content to a document they are working on or reviewing. For example, a user authoring a research article that contains results of a scientific study in a specific medical field may be interested in previous research articles that are similar to the research article they are preparing. A keyword search may be able to identify documents that relate to the same medical field, but it may not be able to identify documents that contains results of a scientific study as the input document does.

In order to identify similar documents, some currently used search mechanisms provide for searching for documents by comparing the entire or majority of content of the input document with every other document in the document library. This is a complex, time consuming and resource intensive process, as it requires comparisons between every or many portions (e.g., each sentence) of the input document to contents of each of the searched documents. Such searching requires extensive use of computer resources such as memory, processing elements and bandwidth. Furthermore, in fields where many documents share the same or similar formatting and/or standard language (e.g. boilerplate legalese), comparing entire contents of documents with each other may result in identifying false positives that contain the same standard language (e.g., same words) and/or formatting but differ significantly in substance (e.g., semantics and subject matter). Thus, there exists a technical problem of current search mechanisms for performing content similarity in documents being computer resource and time intensive and providing inaccurate search results that may be similar in form but not in substance.

To address these technical problems and more, in an example, this description provides technical solutions for identifying documents that are similar in content to a given input document by comparing one or more semantic entity categories of the given document to semantic entity categories of candidate documents. This may be achieved by first receiving document classification attributes relating to the document and/or relating to semantic entities within the document for both the input document and candidate documents. In some implementations, the received document classification attributes are in the form of metadata associated with documents. These document classification attributes may be received from a third-party system that analyzes the documents to generate the classification attributes for each document. Once the document classification attributes are received, candidate documents may be filtered based on one or more classification attributes of the input document. In some implementations, candidate documents may also be filtered based on user data and/or organization data (e.g., data related to users associated with the input document or user data related to the user performing the search). Once candidate documents are filtered based on initial classification attributes and/or additional data, extracted semantic entities within the given input document may be compared to matching semantic entities of candidate documents. This may be achieved by calculating a similarity score between each pair of semantic entities. Semantic entities having a similarity score that exceeds a given threshold may be identified as matching entities. The number of matching document classification attributes and semantic entities may then be calculated and/or a weighted sum of the number of matches may be computed to calculate a total similarity score for each candidate document. The candidate documents may then be ranked based on their total similarity score. Candidate documents with high total similarity scores may be returned as search results to the user. In this manner, the technical solution provides a searching system that can search for and correctly identify documents that are similar in content and/or substance to a given input document.

As will be understood by persons of skill in the art upon reading this disclosure, benefits and advantages provided by such implementations can include, but are not limited to, a technical solution to the technical problems of lack of mechanisms for efficient and accurate identification of documents containing similar content as a given input document. Technical solutions and implementations provided herein offer a mechanism for receiving document classification attributes for a given document and candidate documents, comparing the documents based on the classification attributes, and calculating similarity scores for extracted semantic entities of the documents to identify similar documents. The benefits made available by these technology-based solutions provide searching mechanisms that offer accurate identification of similar in content documents in a manner that reduces memory, processing and bandwidth requirements.

As used herein, the term "document" may refer to an electronic file that includes content such as text (e.g., alphabets, numbers, symbols). The term "input document" may refer to a document used as an input for identifying similar documents. The term "candidate document" may be used to refer to any document in a searchable document library which can be searched and identified as a search result. The term "document classification attributes" may refer to one or more category of attributes by which a document can be classified. The term "semantic entity" may refer to a portion of a document having specific characteristics. In an example, a sentence being classified as belonging to a specific type (e.g., fact or opinion) may be a semantic entity.

FIG. 1A illustrates an example system 100, upon which aspects of this disclosure may be implemented. The system 100 may include a server 110, which may itself include an application 112, a document search engine 114 and a training mechanism 116. While shown as one server, the server 110 may represent a plurality of servers that work together to deliver the functions and services provided by each engine or application included in the server 110. The server 110 may operate as a shared resource server located at an enterprise accessible by various computer client devices such as a client device 130. The server 110 may also operate as a cloud-based server for offering document search services in one or more applications such as application 112 and/or application 134.

The server 110 may include and/or execute a document search engine 114, which may receive a request for searching for documents containing content that is similar to a given input document. The search request may be received via an application such as the application 112 or 134 and may include the input document or a reference to a storage medium (e.g., link) from which the input document may be retrieved. The document search engine 114 may process the request by retrieving document classification attributes for the input document. The document search engine 114 may also retrieve additional data (e.g., organization data) and utilize one or more retrieved document classification attributes and/or additional data to identify candidate documents that correspond with the retrieved document classification attributes and/or additional data. The identified candidate documents may be further filtered with additional document classification attributes as discussed in more details below. One or more modules and elements of the document search engine 114 may include one or more ML models. The internal structure of and data flow between the various elements of the document search engine 114 is discussed in greater detail with respect to FIG. 1B.

One or more ML models implemented by the document search engine 114 may be trained by the training mechanism 116. The training mechanism 116 may use training data sets such as training data 160 stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. The initial training may be performed in an offline stage. Additionally, and/or alternatively, the one or more ML models may be trained using batch learning.

The system 100 may include a server 120 which may be connected to or include the data store 122 which may function as a repository in which datasets may be stored. The data store 122 may include a document library 124, organization data 126, document attribute library 128 and training data 160. The document library 124 may be a dataset containing organization specific documents or documents for multiple organizations. The documents stored in the document library 124 may form a corpus of searchable candidate documents from which documents similar to an input document may be identified. The input document may be stored in the document library 124. Alternatively, the input document may be stored elsewhere. Although shown as a single data store, the data store 122 may be representative of multiple storage devices and data stores which may be accessible by one or more of the document search engine 114, training mechanism 116, and applications 112/134.

The client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134). Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 7 and 8.

The client device 130 may include a local application 134. The application 134 may be a computer program executed on the client device that configures the device to be responsive to user input to allow a user to interactively search for documents similar to a given input document. For example, the application 134 may enable the user to interactively submit a search query and receive search results for similar documents. In an example, the application 134 enables the user to create, edit, and/or review a document, while enabling the user to search for and/or review documents similar to the document they are working on. Examples of suitable applications include, but are not limited to, a word processing application, a presentation application, a note taking application, collaboration application, and file management application.

In some examples, the application used to submit the search query and/or review search results is executed on the server 110 (e.g., application 112) and provided via an online service. In some implementations, web applications communicate via the network 140 with a user agent 132, such as a browser, executing on the client device 130. The user agent 132 may provide a user interface that allows the user to interact with the application 112. User data from the application 134 or application 112 may be provided via the network 140 to the document search engine 114 for use in conducting a search.

FIG. 1B depicts an example data flow between some of the elements of the example system 100. The document search engine 114 may include a document category identification engine 150, semantic entity comparison engine 152, and a ranking engine 154. A search query 156 may be received via an application that provides functionality for identifying similar documents. The request for identifying similar documents may be an explicit search request submitted by a user via a UI associated with the application 112 or 134. Alternatively, the request may be transmitted automatically via the application 112 or 134 to provide automatic content recommendations to the user. For example, the application 112 or 134 may examine the content of a document a user is interacting with (e.g., working on), determine based on the actions of the user and/or other parameters that the user is creating content and would benefit from reviewing similar documents, and create a search query for documents similar to the current document. This may be done by utilizing one or more ML models that perform NLP and/or other functions to automatically create one or more search queries for a document and/or user. The search query 156 may include references to the input document 158. For example, the search query 156 may include an address (e.g., a link) to a storage medium from which the input document 158 may be retrieved. In some implementations, the search query includes a copy of the input document 158.

In some implementations, the search query 156 also includes data relating to the user conducing the search. For example, the search query 156 may include a user identification for the searching user or user identifications for users associated with the input document 158. The user identification information may be utilized to retrieve additional data from the organization data 126. The organization data 126 may include an organization's knowledge graph data (e.g., different users' roles within the organization and how each role is related to other roles). This information may be helpful in retrieving or creating contextual data which can be used to generate more accurate and/or relevant search results. For example, attributes of the organization and users' area of expertise may be used to enhance the search. User information may relate to the searching user and/or users associated with the input document (e.g., author, editors, reviewers, etc.). For one or more of these users, the identification information may be used to determine their role within the organization, department or teams to which they belong, types of projects they work on and the like. This type of information may be used as filters or weighting factors in filtering documents and/or ranking identified documents.

Once the search query 156 is received, the document search engine 114 may retrieve the input document 158. In some implementations, the document search engine 114 may determine whether the input document has been preprocessed to determine its document classification attributes and/or identify whether it includes any semantic entities. In some implementations, the document classification attributes and/or semantic entities are stored as metadata with the document. In such implementations, the document classification attributes and/or semantic entities may be retrieved and/or received with the input document 158. Additionally or alternatively, document classification attributes and/or semantic entities may be stored and retrieved from the document attribute library 128.

The document attribute library 128 may store document classification attributes and/or semantic entities for searchable documents within a given document library such as the document library 124. In an example, document classification attributes and/or semantic entities are stored as metadata along with the documents. In some implementations, the classification data is stored as vector embeddings in a vector space.

When the document search engine 114 determines that the input document 158 has not been preprocessed to determine its classification attributes, the document search engine 114 may transmit the input document 158 to a document classification engine 162 for preprocessing. The document classification engine 162 may a third-party classifier that analyzes and classifies documents according to predetermined classifications and/or needs of the third-party. In some implementations, the document classification engine 162 transmits the classification results directly to the document search engine 114. Additionally or alternatively, the document classification engine 162 transmits the classification results to the document attribute library 128 for storage and/or retrieval by the document search engine 114.

Once document classification attributes for the input document 158 and the candidate documents are available, the document comparison engine 114 may make use of the document attribute comparison engine 150 to identify candidate documents that are associated with the same or similar classification attributes as the input document 158. This may involve identifying the classification attributes associated with the input document 158 and then examining the document attribute library 128 to identify candidate documents having the same classification attributes. For example, if the input document is classified as having medical scientific research as its subject matter attribute (e.g., the subject matter category of the input document is identified as being medical scientific research), the document attribute library 128 may be examined to identify candidate documents being classified as having medical scientific research subject matter. This may result in filtering the candidate documents by classification attributes of the input document 158 to select a subset of the candidate documents. This reduces the number of candidate documents that need to be comparing to the input document 158 in future steps, resulting in reduced amount of processing and computer resources needed for comparing documents. Furthermore, filtering documents by classification attributes of the input document 158 may lead to more accurate and relevant search results.

In some implementations, the document attribute comparison engine 150 takes into account the user, document and/or organization data discussed above. This may be performed to filter the candidate documents based on contextual data such that documents with classification attributes associated with the user or related to users associated with the document are provided as search results. For example, if the author of the input document 158 is identified as being a medical researcher, documents having medical research as one of their subject matters may be selected.

Once the document attribute comparison engine 150 selects a subset of the candidate documents for comparison, the selected subset may be provided to the semantic entity comparison engine 152. Semantic entity comparison engine 152 may retrieve extracted semantic entities for the input document 158 from the document classification engine 162 and/or the document attribute library. Each extracted semantic entity of the document input 158 may have an attribute classification as discussed in more detail below with respect to FIG. 2. Each extracted semantic entity may also be associated with a vector representation in a vector space. In some implementations, extracted semantic entities of the selected subset of candidate documents may be examined to identify candidate documents having the same types of semantic entities as those of the input document 158. For candidate documents having the same types of semantic entities as those of the input document 158, each of the same type of semantic entity in the candidate document may be compared against semantic entities of the candidate documents. For example, extracted sentences in the input document that are identified as facts may be compared against each extracted fact sentence in a candidate document within the subset of candidate documents. The comparison may be achieved by utilizing a similarity determination algorithm. In an example, this achieved by using vector embeddings and calculating similarity cosines as is known in the art.

In some implementations, for each comparison (each two compared semantic entities), the document attribute comparison engine 150 calculates a similarity score. The similarity scores may be examined by the document attribute comparison engine 150 to identify scores that exceed a given threshold to identify matches. For example, sentences having similarity scores above 0.3 may be identified as being sufficiently similar to be considered a match. The number of matches and the similarity scores for each classification attribute and/or semantic entity may then be taken into account to calculate a weighted total similarity score for a candidate document. The weights for the different classification attributes and/or semantic entities may be predetermined or may vary depending on other parameters. To calculate the similarity scores, identify the weights and/or perform other operations, the document attribute comparison engine 150 may make use of one or more ML models.

As a general matter, the methods and systems described herein may include, or otherwise make use of one or more ML model to perform natural language processing (NLP), vectorize document attributes, compare and/or analyze content and/or calculate similarity scores. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in documents, determine associations between various words, and identify similarities and/or classify content. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

Once the semantic entity comparison engine 152 calculates total similarity scores for one or more candidate documents, the resulting similarity scores may be provided to the ranking engine 154. The ranking engine 154 may utilize the similarity scores and other parameters such as contextual data (e.g., searcher data, etc.) to rank the candidate documents based on their order of similarity and/or relevance. In an example, candidate documents having a total similarity score that exceeds a threshold similarity measure may be selected as search results that should be presented to the user. In another example, a top percentage of candidate documents (e.g., candidate documents having the top 25% similarity scores) may be selected. The manner in which search results are selected based on the ranking may depend on the number of identified candidate documents and the top similarity scores. Once the ranking engine 154 has identified one or more candidate documents as search results, information about those results may be provided as results 164 for presentation to the user. In an example, the document comparison engine 114 provides data about the search result documents to the applications 134/112 for display to the user. The applications 134/112 may then display a list of identified candidate documents that are similar to the input document 158 for the user's review, retrieval and/or analysis. In some implementations, a link to the identified search results is provided to the application which can in turn provide the link for display to enable the user to retrieve the documents.

Figure 1C:
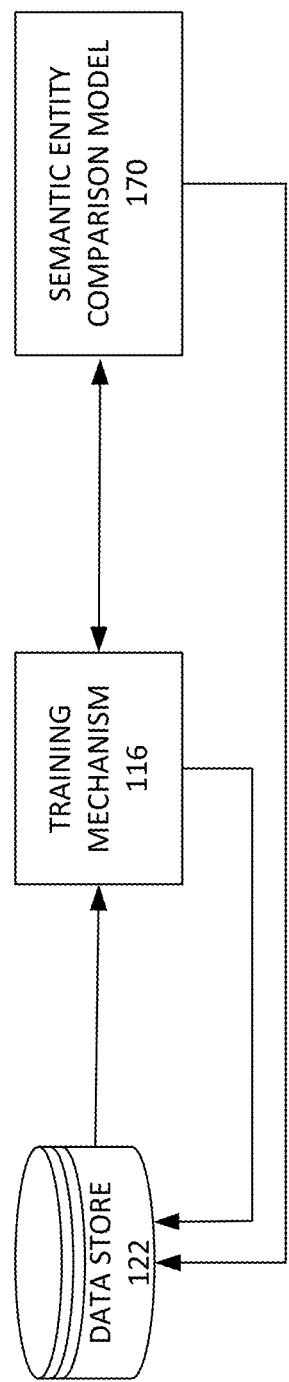
FIG. 1C how one or more machine-learning (ML) models used by a document search engine may be trained.

FIG. 1C depicts how one or more ML models used by the document comparison engine 114 may be trained by using the training mechanism 116. The training mechanism 116 may use labeled training data sets stored in the data store 122 to provide initial and ongoing training to the semantic entity comparison model 170. In some implementations, unlabeled training datasets are used. In some implementations, to provide ongoing training, the training mechanism 116 may use training data sets received from the ML models. Furthermore, data may be provided from the training mechanism 116 to the data store 122 to update one or more of the training datasets in order to provide updated and ongoing training. Additionally, the training mechanism 122 may receive training data such as knowledge from other pre-trained mechanisms.

Figure 2:
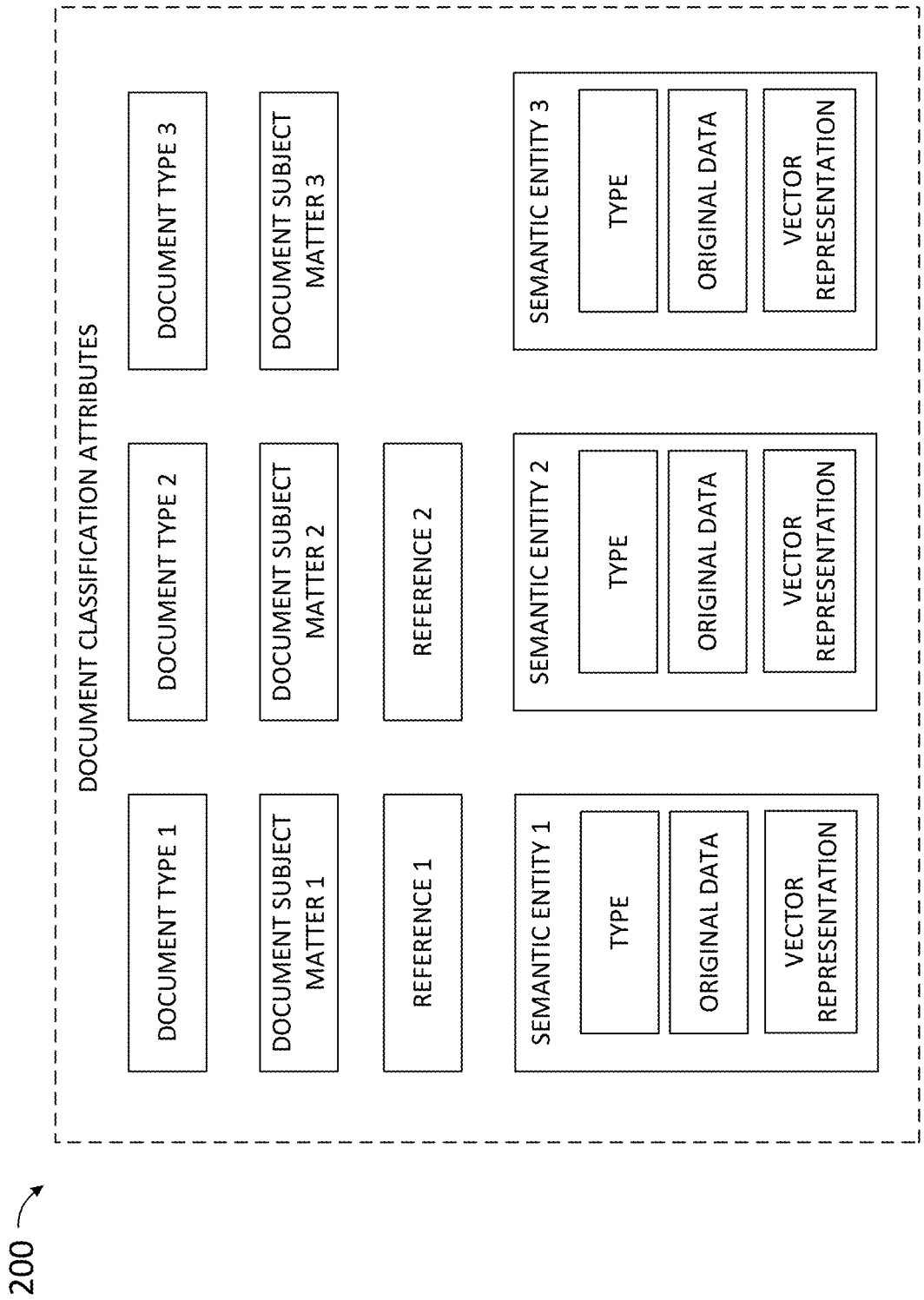
FIG. 2 depicts example document classification attributes for an example document.

FIG. 2 depicts example document classification attributes 200 for an example document. To ensure document subject matter and/or other substantive document attributes are taken into account when comparing documents for similarities, documents may be preprocessed to classify their content. In an example, document classification attributes may include one or more document level attributes that classify the entire document, as well as classifications for extracted semantic entities. Classification attributes for the entire document may include attributes that categorize the document based on type, subject matter, references and the like. For example, a document type attribute may be used to classify the as belonging to one or more document types. Document types may include application types (e.g., word processing document, spreadsheet document, email document, etc.) or content type (e.g., scientific research, sales report, legal document, story, etc.). A document may be classified as being associated with more than one type of document. For example, a document may be both a sales report and an income report.

Another classification attribute may relate to the subject matter of the document. The subject matter attribute may classify the document as having one of a plurality of known subject matters. Additionally or alternatively, the subject matter may be extracted from the document content using one or more NLP algorithms. In an example, for a document classified as having a scientific research type, the subject matter may be medical, climate change, geology, and the like. Similar to the document type attribute, a document may be classified as having more than one subject matter. For example, a legal document may be classified as having employment law and contract law subject matters.

In addition to the document type and document subject matter, other document attributes may also be used for classification. In some implementations, references cited in documents are used as classification attributes. For example, sources cited as references may each be used as a category in the references attribute (e.g., input document cites to source A and source B as references). The reference attribute may be useful in identifying similar documents because documents that cite to the same references are likely to contain similar subject matter.

To ensure that more detailed content information is considered when identifying similarities, document portions having specific attributes may be identified as semantic entities of the document. In an example, a sematic entity is a sentence being classified as one or more specific types of sentences. For example, a sentence being classified as fact or opinion may be extracted as a semantic entity, while sentences that are questions or imperative sentences may not be identified as being semantic entities. Depending on the needs of the organization, types of documents, and the like, semantic entities may be document portions that are smaller or larger than a sentence (e.g., a phrase, paragraph, table, graph, etc.). The categories for the type of semantic entity may be related to the types of documents and may vary for different organizations. Once semantic entities are identified, they may be extracted as classification attributes. In an example, an extracted semantic entity may include information about the type of semantic entity (e.g., fact or opinion), the original data (e.g., original text of the sentence), as well as a vector representation of the original data. The document classification attributes for the entire document and the extracted semantic entities may be stored as document attributes in a document attribute library such as the document attribute library 128 of FIGS. 1A-1B. It should be noted that the document classification attributes and semantic entities depicted in FIG. 2 are merely exemplary. Depending on the needs of the documents in a document library and the type of document classification engine used to classify the documents, document attributes and classifications may change. Any document classification mechanism may be used to generate document classification attributes and semantic entities which may then be used by the document search engine disclosed herein to identify similar documents.

Figure 3:
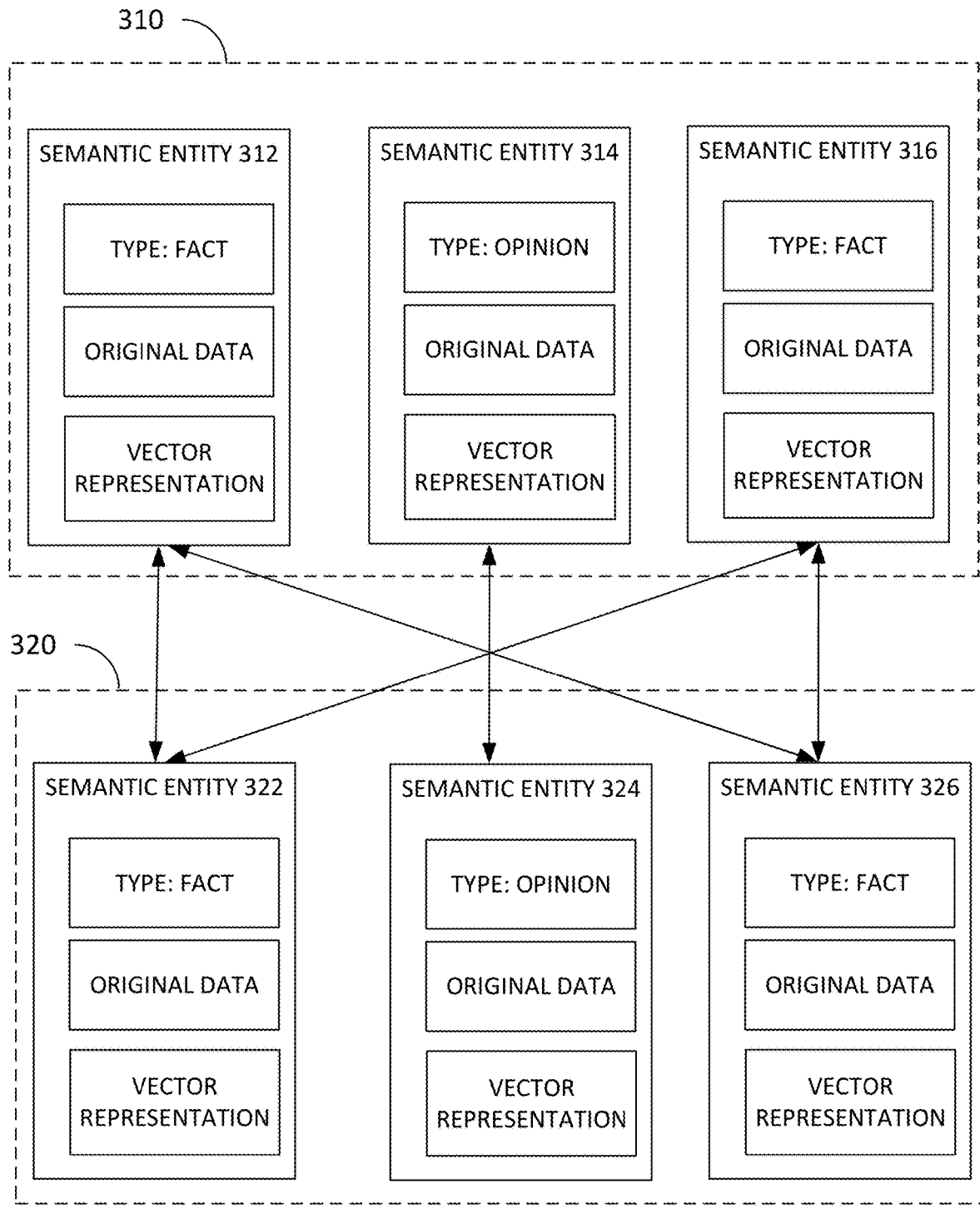
FIG. 3 depicts an example comparison diagram for comparing semantic entities of two different documents.

FIG. 3 depicts an example comparison diagram for comparing semantic entities of two different documents. Classification attributes 310 may display extracted semantic entities for an input document, while classification attributes 320 display extracted semantic entities for a candidate document. When semantic entities 312, 314 and 316 of the input document are examined, their type is compared to the types associated with the semantic entities 322, 324 and 326. For each semantic entity of the classification attributes 310 that matches the type of a semantic entities 322, 324 and 326, the entities may be compared. Thus, semantic entities 312 and 316 being classified as facts are each compared to each of the semantic entities 322 and 326 that are also classified as being facts. Similarly, semantic entity 314 which is classified as being an opinion is compared with semantic entity 324 which is also classified as an opinion. In this manner, only semantic entities that have the same or similar attributes are compared with each other. This reduces the amount of content compared with each other. For example, instead of comparing the entire content of two documents, only targeted portions of documents having specific attributes (that are thus likely to be related to each other) are compared. A similarity score may be calculated for each matching semantic entity (e.g., a similarity score is calculated for similarities between semantic entities 312 and 322, semantic entities, 312 and 326, semantic entities 314 and 324, semantic entities 316 and 322 and semantic entities 316 and 326). Semantic entities having similarity scores that exceed a given similarity threshold may then be selected as being similar. The given similarity threshold may be different for different types of semantic entities. For example, to be considered similar, opinion semantic entities may need to exceed a larger similarity threshold than fact semantic entities.

Figure 4:
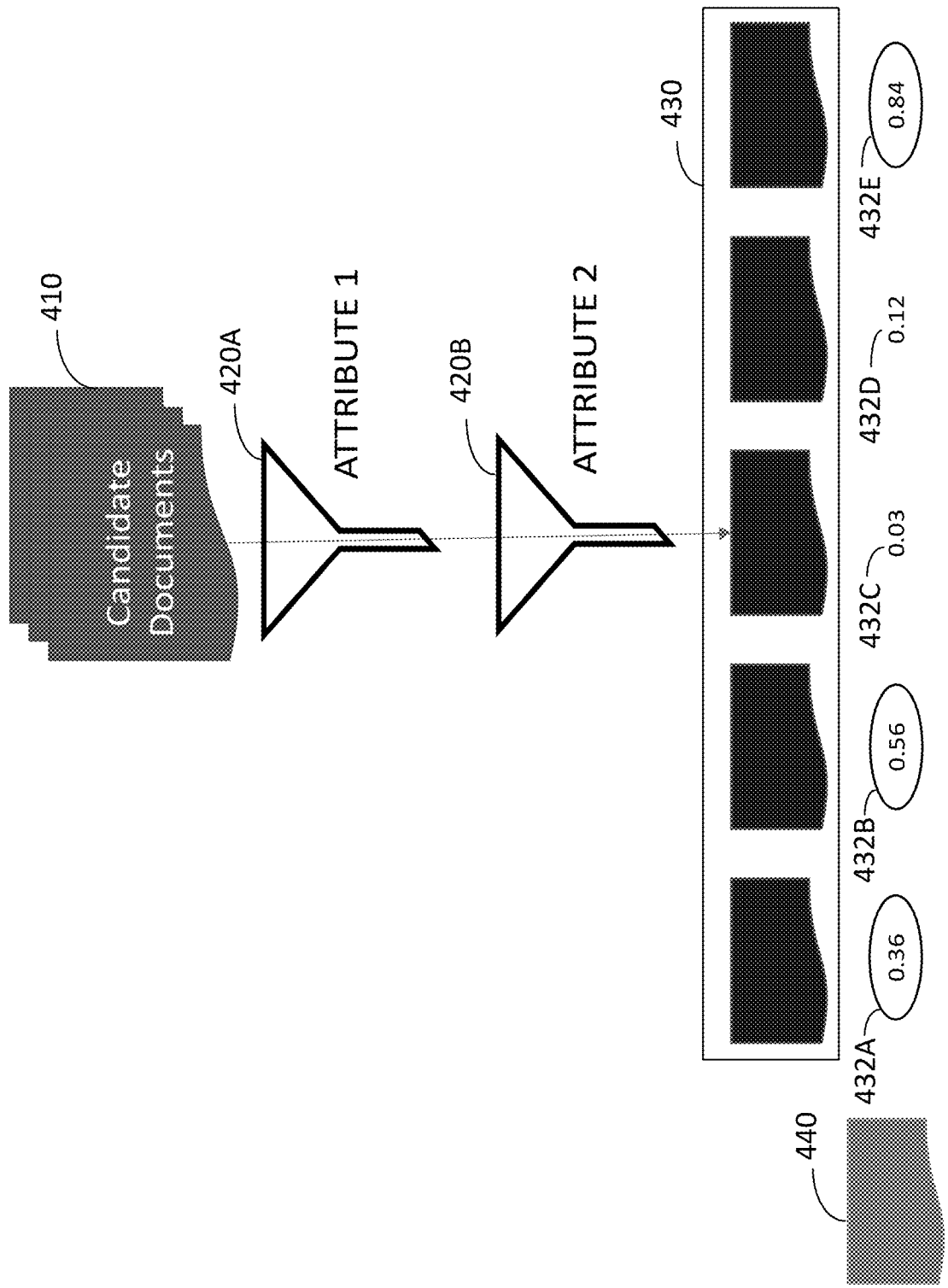
FIG. 4 is a diagram depicting a process of identifying documents that are similar content to an input document.

FIG. 4 is a diagram depicting a process of identifying documents that are similar in content to an input document. When a request for identifying documents that are similar in content to an input document 440 is received, a set of candidate documents 440 may be filtered by a first document attribute, attribute 1 and then by a second document attribute, attribute 2 via filtration processes 420A-420B. The first and second attributes may be identified document classification attributes of the input document 440. The filtration process 420A may examine the candidate documents 410 to identify candidate documents having attribute 1 as one of their document classification attributes. Once candidate documents that have attribute 1 as one of their classification attributes are identified, those candidate documents may further be filtered via the filtration process 420B to identify those that also have attribute 2 as one of their classification attributes. In this manner, candidate documents 410 are gradually filtered to match the identified attributes of the input document 440. The resulting identified documents form a subset 430 of the candidate documents 410. It should be noted that while two attributes are depicted in FIG. 4, the number of attributes by which the candidate documents 410 may be filtered can vary and may depend on the input document 440 and/or the needs of the application or organization.

Once the subset 430 of documents that match the document classification attributes of the input document 440 have been identified, extracted semantic entities of each of the subset documents 430 may be compared with extracted semantic entities of the input document 440, as discussed above. A total similarity score 432A-432E may then be calculated for each of the documents in the subset 430, based on the number of matching semantic entities, similarity score of the matching semantic entities and/or the number/weight of matching document classification attributes. Each of the documents in the subset 430 having a total similarity score that exceeds a given similarity threshold may then be selected as a similar document. For example, similarity scores 432A, 432B and 432E which exceed the similarity threshold of 0.3 may be selected as sufficiently similar to the input document 440 to be presented as search results.

Figure 5:
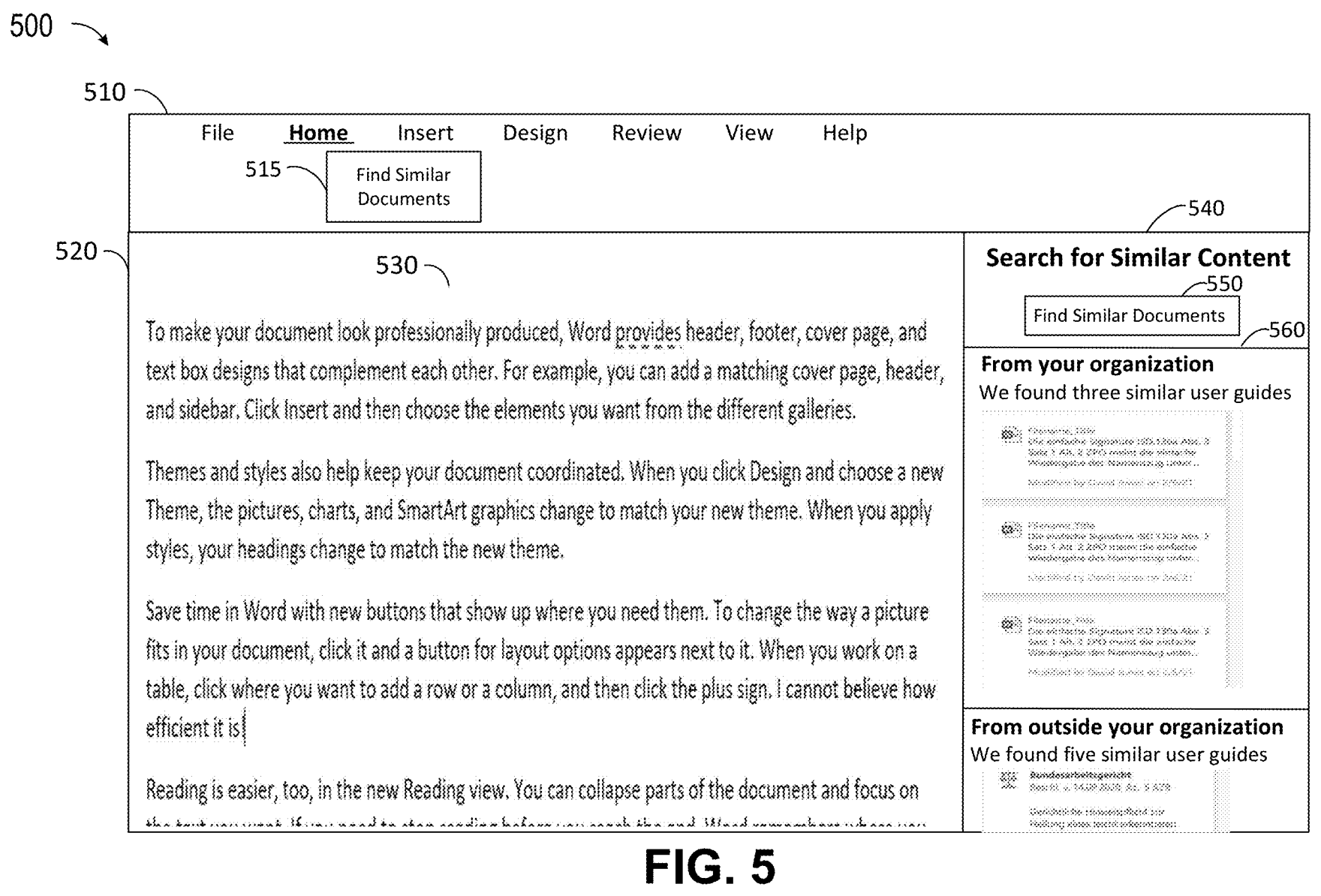

FIG. 5 depicts an example GUI screen 500 of an application or service that provides similar document identification services. The example GUI screen 500 depicts a user interface (UI) screen of a word processing application (e.g., Microsoft Word®) displaying an example document the user is working on. GUI screen 500 may include a toolbar menu 510 containing different menu options for performing various tasks in the application. For example, the toolbar menu 510 may provide options for the user to perform one or more tasks to create or edit the document. Among the options provided in the toolbar menu 510, a UI element 515 may be provided to enable the user to submit a request for finding documents that are similar to the current document. The UI element 515 may be any menu option that can be used to indicate a request by the user. When the user utilizes an input/output device such as a mouse to click on the UI element 515 515, this may result in the display of search results for similar documents.

The GUI screen 500 may include a content pane 520 for display document content 530 of a currently open document. The content may be displayed to the user for viewing and/or editing purposes and may be created by the user. For example, the user may utilize an input device (e.g., a keyboard) to insert input such as text and the like into the content pane 520. In some implementations, the GUI screen 500 also includes a similar documents pane 540 for searching for and displaying lists of similar documents. The similar documents pane 540 may also include a menu option 550 for transmitting a request to search for similar documents.

Once the user submits a search query via the menu option 515 or 550, the request may be transmitted to a document search engine (e.g., document search engine 114 of FIGS. 1A-1B) as discussed above. After searching is completed, the document search engine may transmit the search results to the application which may then display the results in a results pane portion 560 of the similar documents pane 540. As depicted, the results pane portion 560 may organize the search results by their sources (e.g., depending on the type of document library they were retrieved from). For example, documents from within the user's organization may be displayed at the top of the results pane portion 560, while documents from outside of the user's organization are displayed in the bottom. In some implementations, the results pane portion 560 displays information about the search results such as the number of similar documents found and the type of documents found (e.g., user guides, articles, sales report). The type may match the type of the currently open document and may be retrieved from the document classification attributes. For each of the identified search results, the results pane portion 560 may display the name of the document and a few of its first words (e.g., textual content). The results pane portion 560 may also display when and by whom the document was last modified and/or may include other editing/user history information. The user may be able to access any of the identified search results by clicking on, hovering over or otherwise interacting with the portion of the results pane portion 560 displaying information about the identified document name.

Figure 6:
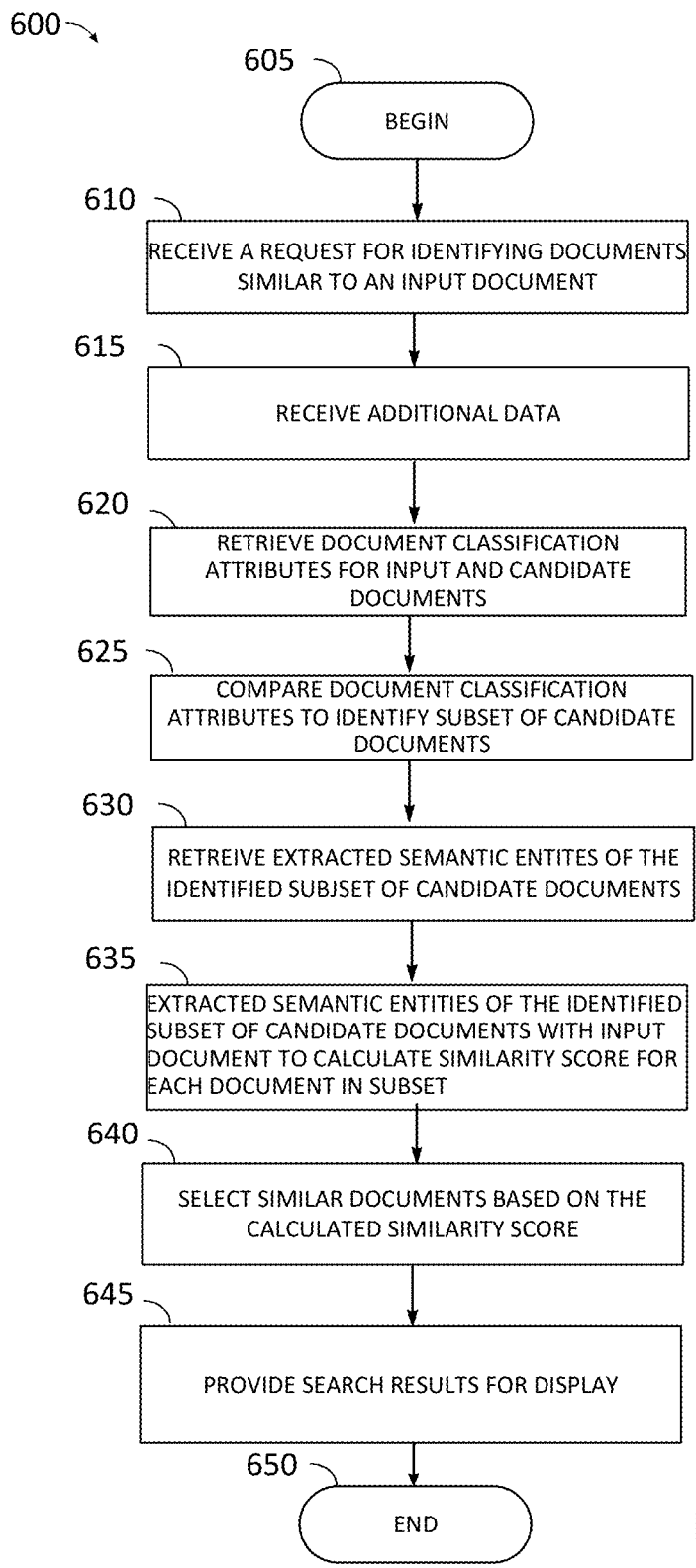
FIG. 6 is a flow diagram depicting an example method for identifying documents that are similar in content to an input document.

FIG. 6 is a flow diagram depicting an exemplary method 600 for identifying documents that are similar in content to an input document. One or more steps of the method 600 may be performed by a document search engine such as the document search engine 114 of FIGS. 1A-1B or by an application such as applications 112/134 of FIGS. 1A-1B. The method 600 may begin, at 605, and proceed to receive a request for documents that are similar to an input document, at 610. This may occur, for example, when a user submits a search request via a UI of an application or service that provides document similarity searching features. The input may be provided via a client device and may then be transmitted via a network to a document search engine. In some implementations, the request includes a copy of the input document or a reference identifying the input document.

Once the request is received, additional data that may be used to identify similar documents may be retrieved, at 615. The additional data may include organization data, user data, contextual data and the like, as discussed in detail above. Method 600 may then proceed to retrieve document classification attributes for the input and candidate documents, at 620. This may involve sending a request to a document classification engine to perform preprocessing on the input document and/or the candidate documents and generate the document classification attributes which may then be retrieved by the method 600.

Once the document classification attributes of the input and candidate documents have been retrieved, method 600 may proceed to compare the document classification attributes of the input document with the document classification attributes of each of the candidate documents to identify candidate documents having document classification attributes that match the document classification attributes of the input document, at 625. Candidate documents having matching document classification attributes may be identified in a subset of candidate documents.

After the subset of candidate documents has been identified, method 600 may proceed to retrieve extracted semantic entities of the input document and subset of candidate documents, at 630. Attributes of the input document's extracted semantic entities may then be compared with attributes of the subset of candidate document's extracted semantic entities to identify matches. Once, matching semantic entities are identified, method 600 may proceed to calculate a similarity score for each pair of matching semantic entities. A total similarity score may then be computed for each document in the subset of candidate documents, at 635. The total similarity score may be calculated based on the number of matching document classification attributes, number of matching semantic entities and each matching semantic entities' similarity score and one or more weight factors for each of the document classification attributes and matching semantic entities. The weight factors may vary depending on the importance of each document classification attribute or matching semantic entity and may be determined by an ML model that takes into account the additional data. In some implementations, the similarity scores may be normalized by the number of matching attributes or by the length of the document.

Once a total similarity score is calculated for each of the documents in the subset of candidate documents, method 600 may proceed to select one or more of the documents in the subset of candidate documents as being similar to the input document, at 640. This may involve ranking the documents based on their total similarity score and selecting a top number or a percentage of the documents having the highest similarity scores as the search results. Once the search results are selected, they may be provided for display, at 645, before method 600 ends, at 650. This may involve transmitting information about the identified candidate documents to the application for display in a UI element.

Figure 7:
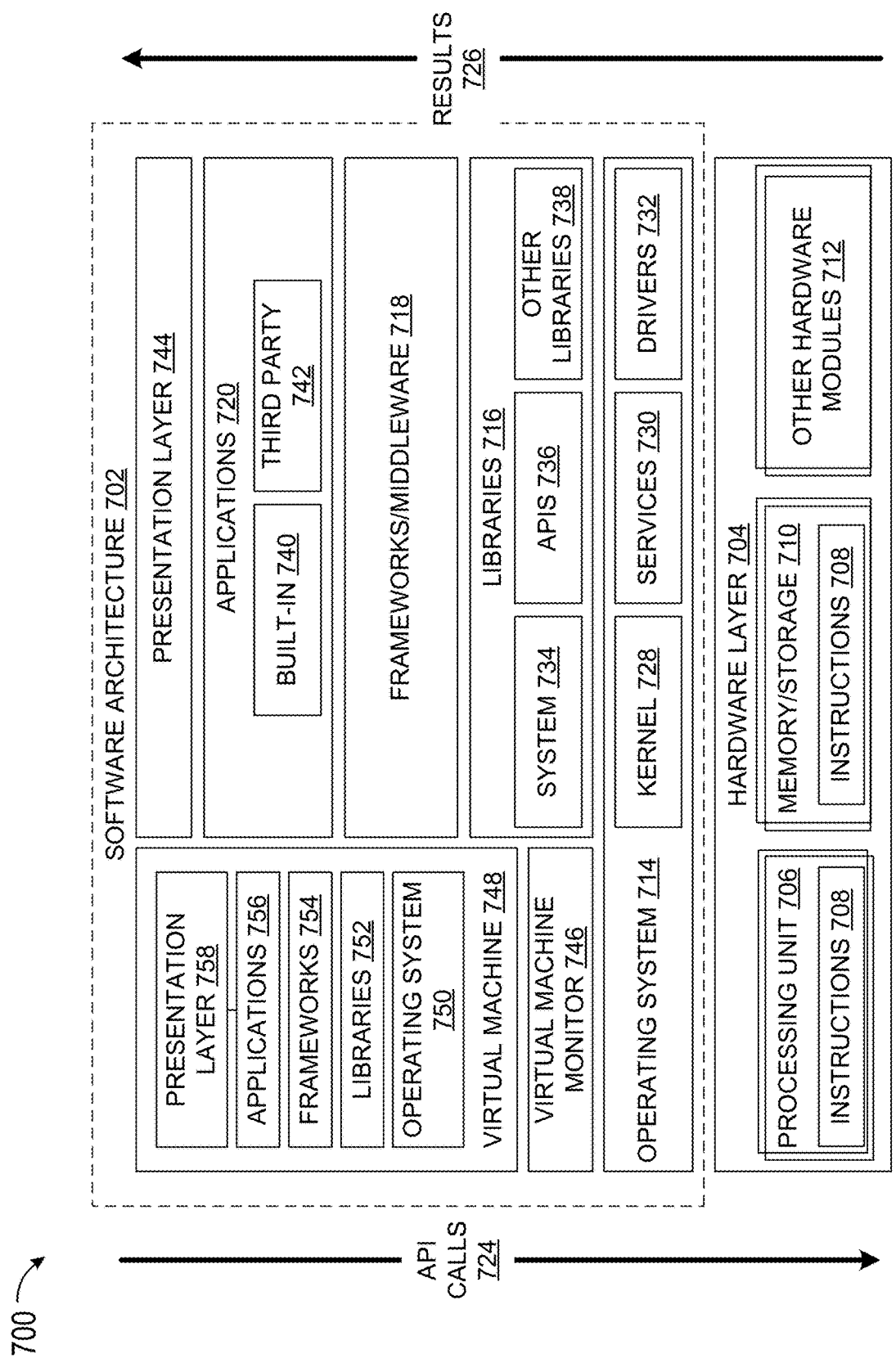
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine depicted in block diagram 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
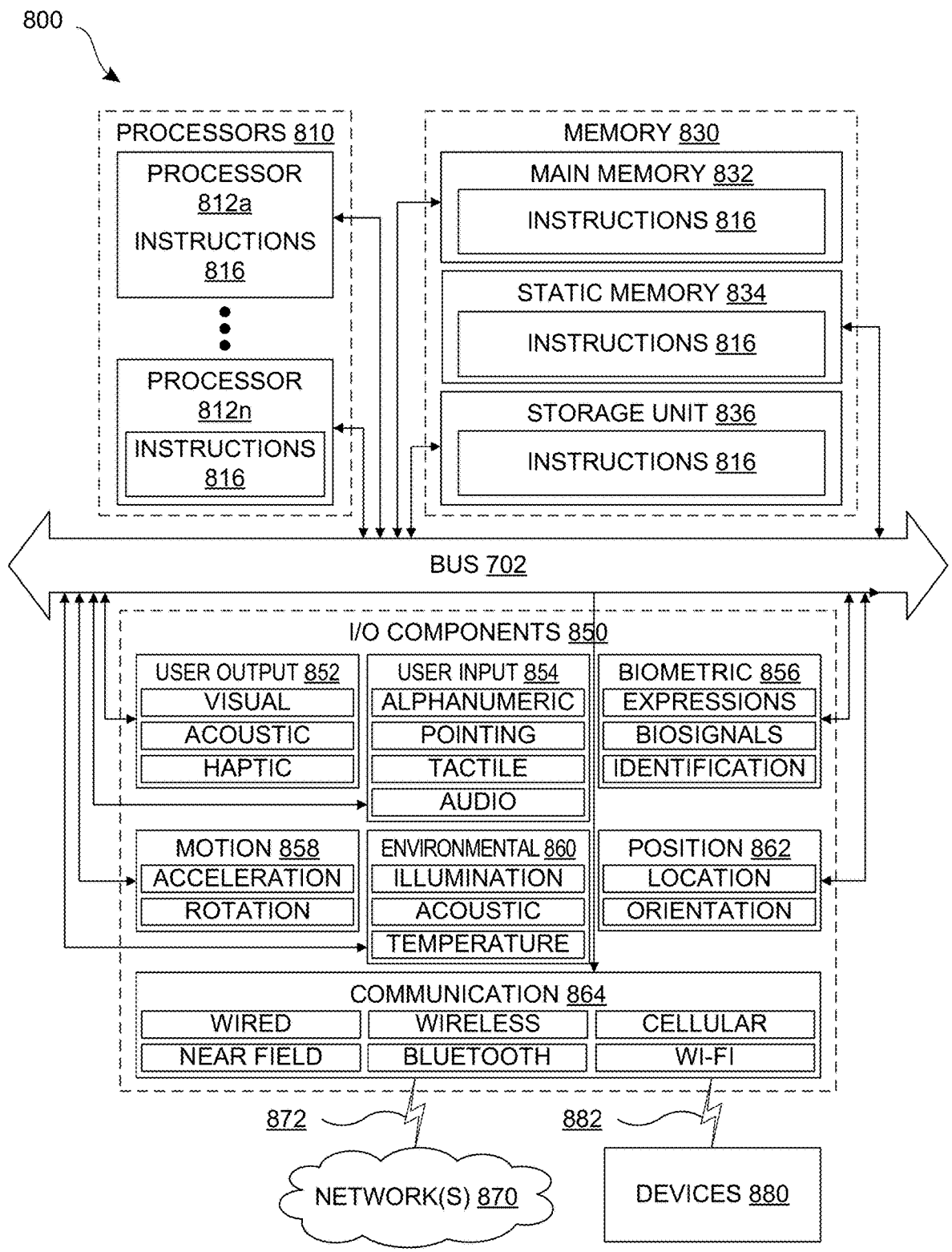
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers). The motion components 858 may include, for example, motion sensors such as acceleration and rotation sensors. The environmental components 860 may include, for example, illumination sensors, acoustic sensors and/or temperature sensors.

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-8) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
   a processor; and
   a memory in communication with the processor, the memory comprising executable instructions that, when executed by the processor, cause the data processing system to perform functions of:
      receiving a request for identifying one or more documents from among a plurality of candidate documents, the identified one or more documents being similar in content to an input document;
      retrieving one or more document classification attributes for the input document and one or more of the plurality of candidate documents, the one or more document classification attributes being document level attributes;
      comparing the one or more document classification attributes of the input document with the one or more document classification attributes of each of the one or more candidate documents to identify a subset of the candidate documents having one or more matching document classification attributes with at least one of the one or more documents classification attributes of the input document;

retrieving one or more semantic entities from the input document and from one or more candidate documents in the subset, at least some of the one or more semantic entities having a semantic entity attribute;

pairwise comparing the semantic entity attribute of the one or more semantic entities of the input document with the semantic entity attribute of the one or more semantic entities of the candidate documents in the subset to identify one or more semantic entities having matching semantic attributes with the one or more semantic entities of the input document;

for semantic entities having matching semantic attributes, calculating a content similarity score between the semantic entity of the input document and the semantic entity of the candidate document in the subset;

calculating a total similarity score for one or more of the candidate documents in the subset based on at least one of the content similarity score, a number of matching document classification attributes, and one or more weight factors;

selecting one or more similar documents from among the one or more candidate documents in the subset based on the total similarity score; and providing information about the one or more identified similar documents for display on a user interface element.

Item 2. The data processing system of claim 1, wherein the one or more document classification attributes and one or more semantic entities are received from a third-party classifier.

Item 3. The data processing system of claim 1, wherein calculating the content similarity score between the semantic entity of the input document and the semantic entity of the candidate document in the subset is done by utilizing a machine-learning (ML) model.

Item 4. The data processing system of claim 1, wherein the executable instructions, when executed by the processor, further cause the data processing system to perform functions of:

ranking the candidate documents in the subset based on the total similarity score; and selecting the one or more similar documents from among the candidate documents in the subset having high similarity score.

Item 5. The data processing system of claim 1, wherein the total similarity score is a weighted sum of the number of matching document classification attributes and the number of matching semantic entities having a similarity score that exceeds a similarity threshold associated with each matching semantic entity.

Item 6. The data processing system of claim 1, wherein a semantic entity is a sentence extracted from the input document or from one of the one or more candidate documents in the subset.

Item 7. The data processing system of claim 6, wherein the semantic entity attribute is a classification attribute of the sentence.

Item 8. A method for identifying one or more documents that are similar in content to an input document comprising:

receiving a request for identifying the one or more documents from among a plurality of candidate documents;

retrieving one or more document classification attributes for the input document and one or more of the plurality of candidate documents, the one or more document classification attributes being document level attributes;

comparing the one or more document classification attributes of the input document with the one or more document classification attributes of each of the one or more candidate documents to identify a subset of the candidate documents having one or more matching document classification attributes with at least one of the one or more documents classification attributes of the input document;

retrieving one or more semantic entities from the input document and from one or more candidate documents in the subset, at least some of the one or more semantic entities having a semantic entity attribute;

pairwise comparing the semantic entity attribute of the one or more semantic entities of the input document with the semantic entity attribute of the one or more semantic entities of the candidate documents in the subset to identify one or more semantic entities having matching semantic attributes with the one or more semantic entities of the input document;

for semantic entities having matching semantic attributes, calculating a content similarity score between the semantic entity of the input document and the semantic entity of the candidate document in the subset;

calculating a total similarity score for one or more of the candidate documents in the subset based on at least one of the content similarity score, a number of matching document classification attributes, and one or more weight factors;

selecting one or more similar documents from among the one or more candidate documents in the subset based on the total similarity score; and providing information about the one or more identified similar documents for display on a user interface element.

Item 9. The method of claim 8, wherein at least one of the document classification attributes and one or more semantic entities are stored as metadata.

Item 10. The method of claim 8, wherein calculating the content similarity score between the semantic entity of the input document and the semantic entity of the candidate document in the subset is done by utilizing a machine-learning (ML) model.

Item 11. The method of claim 8, further comprising:

ranking the candidate documents in the subset based on the total similarity score; and selecting the one or more similar documents from among the candidate documents in the subset having high similarity score.

Item 12. The method of claim 8, wherein the total similarity score is a weighted sum of the number of matching document classification attributes and the number of matching semantic entities having a similarity score that exceeds a similarity threshold associated with each matching semantic entity.

Item 13. The method of claim 8, wherein a semantic entity is a sentence extracted from the input document or from one of the one or more candidate documents in the subset.

Item 14. The method of claim 13, wherein the semantic entity attribute is a classification attribute of the sentence.

Item 15. A non-transitory computer readable medium on which are stored instructions that, when executed, cause a programmable device to perform functions of:
 receiving a request for identifying one or more documents from among a plurality of candidate documents, the identified one or more documents being similar in content to an input document;
 retrieving one or more document classification attributes for the input document and one or more of the plurality of candidate documents, the one or more document classification attributes being document level attributes;
 comparing the one or more document classification attributes of the input document with the one or more document classification attributes of each of the one or more candidate documents to identify a subset of the candidate documents having one or more matching document classification attributes with at least one of the one or more documents classification attributes of the input document;
 retrieving one or more semantic entities from the input document and from one or more candidate documents in the subset, at least some of the one or more semantic entities having a semantic entity attribute;
 pairwise comparing the semantic entity attribute of the one or more semantic entities of the input document with the semantic entity attribute of the one or more semantic entities of the candidate documents in the subset to identify one or more semantic entities having matching semantic attributes with the one or more semantic entities of the input document;
 for semantic entities having matching semantic attributes, calculating a content similarity score between the semantic entity of the input document and the semantic entity of the candidate document in the subset;
 calculating a total similarity score for one or more of the candidate documents in the subset based on at least one of the content similarity score, a number of matching document classification attributes, and one or more weight factors;
 selecting one or more similar documents from among the one or more candidate documents in the subset based on the total similarity score; and
 providing information about the one or more identified similar documents for display on a user interface element.

Item 16. The non-transitory computer readable medium of claim 15, wherein at least one of the document classification attributes and one or more semantic entities are stored as metadata.

Item 17. The non-transitory computer readable medium of claim 15, wherein calculating the content similarity score between the semantic entity of the input document and the semantic entity of the candidate document in the subset is done by utilizing a machine-learning (ML) model.

Item 18. The non-transitory computer readable medium of claim 15, wherein the total similarity score is a weighted sum of the number of matching document classification attributes and the number of matching semantic entities having a similarity score that exceeds a similarity threshold associated with each matching semantic entity.

Item 19. The non-transitory computer readable medium of claim 15, wherein a semantic entity is a sentence extracted from the input document or from one of the one or more candidate documents in the subset.

Item 20. The non-transitory computer readable medium of claim 19, wherein the semantic entity attribute is a classification attribute of the sentence.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving a request for identifying one or more documents from among a plurality of candidate documents, the identified one or more documents being similar in content to an input document;
retrieving one or more document classification attributes for the input document and one or more of the plurality of candidate documents, the one or more document classification attributes being document level attributes;
comparing the one or more document classification attributes of the input document with the one or more document classification attributes of each of the one or more candidate documents to identify a subset of the candidate documents having one or more matching document classification attributes with at least one of the one or more document classification attributes of the input document;
retrieving one or more semantic entities from the input document and from one or more candidate documents in the subset, at least one or more of the one or more semantic entities having a semantic entity attribute;
pairwise comparing the semantic entity attribute of the one or more semantic entities of the input document with the semantic entity attribute of the one or more semantic entities of the candidate documents in the subset to identify one or more semantic entities having matching semantic attributes with the one or more semantic entities of the input document;
for semantic entities having matching semantic attributes, calculating a content similarity score between the semantic entity of the input document and the semantic entity of one or more of the candidate documents in the subset;
calculating a total similarity score for one or more of the candidate documents in the subset based on at least one of the content similarity score, a number of matching document classification attributes, and one or more weight factors;
selecting one or more similar documents from among the one or more candidate documents in the subset based on the total similarity score; and
providing information about the one or more identified similar documents for display on a user interface element.

2. The data processing system of claim 1, wherein the one or more document classification attributes and one or more semantic entities are received from a third-party classifier.

3. The data processing system of claim 1, wherein calculating the content similarity score between the semantic entity of the input document and the semantic entity of the candidate document in the subset is done by utilizing a machine-learning (ML) model.

4. The data processing system of claim 1, wherein the executable instructions, when executed by the processor, further cause the data processing system to perform functions of: ranking the candidate documents in the subset based on the total similarity score; and
selecting the one or more similar documents from among the candidate documents in the subset based on the total similarity score.

5. The data processing system of claim 1, wherein the total similarity score is a weighted sum of the number of matching document classification attributes and the number of matching semantic entities having a similarity score that exceeds a similarity threshold associated with each matching semantic entity.

6. The data processing system of claim 1, wherein a semantic entity is a sentence extracted from the input document or from one of the one or more candidate documents in the subset.

7. The data processing system of claim 6, wherein the semantic entity attribute is a classification attribute of the sentence.

8. A method for identifying one or more documents that are similar in content to an input document comprising:
receiving a request for identifying the one or more documents from among a plurality of candidate documents;
retrieving one or more document classification attributes for the input document and one or more of the plurality of candidate documents, the one or more document classification attributes being document level attributes;
comparing the one or more document classification attributes of the input document with the one or more document classification attributes of each of the one or more candidate documents to identify a subset of the candidate documents having one or more matching document classification attributes with at least one of the one or more document classification attributes of the input document;
retrieving one or more semantic entities from the input document and from one or more candidate documents in the subset, at least one or more of the one or more semantic entities having a semantic entity attribute;
pairwise comparing the semantic entity attribute of the one or more semantic entities of the input document with the semantic entity attribute of the one or more semantic entities of the candidate documents in the subset to identify one or more semantic entities having matching semantic attributes with the one or more semantic entities of the input document;
for semantic entities having matching semantic attributes, calculating a content similarity score between the semantic entity of the input document and the semantic entity of one or more of the candidate documents in the subset;
calculating a total similarity score for one or more of the candidate documents in the subset based on at least one of the content similarity score, a number of matching document classification attributes, and one or more weight factors;
selecting one or more similar documents from among the one or more candidate documents in the subset based on the total similarity score; and providing information about the one or more identified similar documents for display on a user interface element.

9. The method of claim 8, wherein at least one of the document classification attributes and one or more semantic entities are stored as metadata.

10. The method of claim 8, wherein calculating the content similarity score between the semantic entity of the input document and the semantic entity of the candidate document in the subset is done by utilizing a machine-learning (ML) model.

11. The method of claim 8, further comprising:
ranking the candidate documents in the subset based on the total similarity score; and
selecting the one or more similar documents from among the candidate documents in the subset based on the total similarity score.

12. The method of claim 8, wherein the total similarity score is a weighted sum of the number of matching document classification attributes and the number of matching semantic entities having a similarity score that exceeds a similarity threshold associated with each matching semantic entity.

13. The method of claim 8, wherein a semantic entity is a sentence extracted from the input document or from one of the one or more candidate documents in the subset.

14. The method of claim 13, wherein the semantic entity attribute is a classification attribute of the sentence.

15. A non-transitory computer readable medium on which are stored instructions that, when executed, cause a programmable device to perform functions of:
receiving a request for identifying one or more documents from among a plurality of candidate documents, the identified one or more documents being similar in content to an input document;
retrieving one or more document classification attributes for the input document and one or more of the plurality of candidate documents, the one or more document classification attributes being document level attributes;
comparing the one or more document classification attributes of the input document with the one or more document classification attributes of each of the one or more candidate documents to identify a subset of the candidate documents having one or more matching document classification attributes with at least one of the one or more document classification attributes of the input document;
retrieving one or more semantic entities from the input document and from one or more candidate documents in the subset, at least one or more of the one or more semantic entities having a semantic entity attribute;
pairwise comparing the semantic entity attribute of the one or more semantic entities of the input document with the semantic entity attribute of the one or more semantic entities of the candidate documents in the subset to identify one or more semantic entities having matching semantic attributes with the one or more semantic entities of the input document;
for semantic entities having matching semantic attributes, calculating a content similarity score between the semantic entity of the input document and the semantic entity of one or more of the candidate documents in the subset;
calculating a total similarity score for one or more of the candidate documents in the subset based on at least one of the content similarity score, a number of matching document classification attributes, and one or more weight factors;
selecting one or more similar documents from among the one or more candidate documents in the subset based on the total similarity score; and
providing information about the one or more identified similar documents for display on a user interface element.

16. The non-transitory computer readable medium of claim 15, wherein at least one of the document classification attributes and one or more semantic entities are stored as metadata.

17. The non-transitory computer readable medium of claim 15, wherein calculating the content similarity score between the semantic entity of the input document and the semantic entity of the candidate document in the subset is done by utilizing a machine-learning (ML) model.

18. The non-transitory computer readable medium of claim 15, wherein the total similarity score is a weighted sum of the number of matching document classification attributes and the number of matching semantic entities having a similarity score that exceeds a similarity threshold associated with each matching semantic entity.

19. The non-transitory computer readable medium of claim 15, wherein a semantic entity is a sentence extracted from the input document or from one of the one or more candidate documents in the subset.

20. The non-transitory computer readable medium of claim 19, wherein the semantic entity attribute is a classification attribute of the sentence.

* * * * *